United States Patent [19]

Moriyasu et al.

[11] Patent Number: 5,799,191
[45] Date of Patent: Aug. 25, 1998

[54] METHOD AND APPARATUS FOR SUPPORTING COOPERATIVE WORKS VIA COMPUTER NETWORK

[75] Inventors: Takashi Moriyasu; Tetsuro Muranaga; Mami Kodama, all of Kanagawa-ken, Japan

[73] Assignee: Kabushiki Kaisha Toshiba, Kawasaki, Japan

[21] Appl. No.: 756,364

[22] Filed: Nov. 19, 1996

Related U.S. Application Data

[63] Continuation of Ser. No. 208,714, Mar. 11, 1994, abandoned.

[30] Foreign Application Priority Data

Mar. 12, 1993 [JP] Japan ..................... 5-052753

[51] Int. Cl.$^6$ ............................................. G06F 13/00
[52] U.S. Cl. ..................... 395/682; 395/676; 395/331; 395/338
[58] Field of Search ..................... 395/331, 338, 395/676, 682

[56] References Cited

U.S. PATENT DOCUMENTS 5,337,407  8/1994  Bates et al. ........................ 345/331
5,379,374  1/1995  Ishizahi et al. ...................... 345/331
5,392,400  2/1995  Berkowitz et al. ............... 395/200.33

OTHER PUBLICATIONS

J. Lauwers, "Collaboration Transparency in Desktop Teleconferencing Environments", Technical Report No. CSL-TR-90-435, Computer Systems Laboratory, Stanford Univ., Jul. 1990, pp. 1–121.

*Primary Examiner*—Jack B. Harvey
*Assistant Examiner*—Jeffrey K. Seto
*Attorney, Agent, or Firm*—Foley & Lardner

[57] ABSTRACT

A scheme for supporting cooperative works capable of reproducing the contents of the past works from the recorded history of the cooperative works accurately, such that the cooperative works can be carried out efficiently and smoothly. In this scheme, the inputs made by each user during the cooperative works are stored in correspondence to input target data indicating input target applications of the inputs as a record of the cooperative works. Then, afterwards, the input target applications indicated by the input target data are re-executed according to the stored inputs to reproduce results of the cooperative works resulting from the inputs which can be presented to each user.

23 Claims, 11 Drawing Sheets

| USER ID | USER | TERMINAL |
|---|---|---|
| 1 | tanaka | sirius |
| 2 | kawada | vega |
| 3 | saitoh | castor |
| 4 | suzuki | deneb |
| --- | --- | --- |

FIG. 5

| INPUT TARGET ID | INPUT TARGET |
|---|---|
| 1 | speech communication |
| 2 | video communication |
| 3 | editor |
| 4 | annotator editor |
| 5 | drawer |
| 6 | annotator drawer |
| --- | --- |

FIG. 6

| INPUT TARGET ID | OPERATION RIGHT HOLDER ID |
|---|---|
| 1 | 0 |
| 2 | 0 |
| 3 | 2 |
| 4 | 0 |
| 5 | 4 |
| 6 | 0 |
| --- | --- |

| APPLICATION | OPERATION RIGHT | |
|---|---|---|
| drawer | suzuki | |
| spreadsheet | tanaka | |
| scheduler | saitoh | |
| pictview | saitoh | |

| MARKER ID | APPLICATION ID | STARTING TIME | ENDING TIME | LINK TARGET |
|---|---|---|---|---|
| 1 | 3 | 10132233 | 10132233 | "comment memo $\ell$" |
| 2 | 7, 9 | 10251032 | 10360918 | |
| 3 | 5 | 10290004 | 10450508 | "pict fig $\ell$" |
| 4 | 15 | 10514321 | 10514321 | |
| --- | --- | --- | --- | --- |

FIG. 17

METHOD AND APPARATUS FOR SUPPORTING COOPERATIVE WORKS VIA COMPUTER NETWORK This application is a continuation of application Ser. No. 08/208,714, filed Mar. 11, 1994 now abandoned.

BACKGROUND OF THE INVENTION

1. Field of the Invention

The present invention relates to a scheme for supporting cooperative works to be carried out at a plurality of terminals connected through a computer network.

2. Description of the Background Art

Recently, it has become possible to realize cooperative works via computer network in which a plurality of participants using a plurality of terminals connected through the computer network can carry out their respective works directed toward the common goal of all the participants in cooperation.

In such cooperative works which are going to be carried out in parallel concurrently by a plurality of participants, it is possible for a part of the participants to be absent for some period of time, such that there arises a need for those who had been absent to learn the progresses of the cooperative works made by the others during that period of time.

For this reason, there is a need to take a record for a series of related cooperative works in order to manage the history of the works done. This record taking has conventionally been realized either by manually writing records, or keeping data for the end result of each work, or else video recording discussions or computer display outputs during each work.

However, such conventional manners for taking records of the cooperative works have been associated with various problems as follows.

First, it is rather difficult to reproduce the cooperative works that had been carried out in parallel concurrently on a single computer afterwards.

Secondly, the recorded data for the end results alone can make it difficult to understand the processes for reaching the end results during the cooperative works afterwards.

Thirdly, the manual record writing can make a record writing person very busy, possibly to an extent of preventing this person from participating in the cooperative works themselves effectively. In addition, the manual record writing is likely to be inaccurate or forgotten by mistakes, so that the reliable record taking has been difficult.

Finally, for the records of the cooperative works to be done in parallel concurrently, it is preferable to facilitate the selective recording and reproduction, but the video recording only has a freedom of editing along time axis, so that it has been difficult to extract a record for a particular work from the entire video records.

SUMMARY OF THE INVENTION

It is therefore an object of the present invention to provide a method and an apparatus for supporting cooperative works capable of reproducing the contents of the past works from the recorded history of the cooperative works accurately, such that the cooperative works can be carried out efficiently and smoothly.

According to one aspect of the present invention there is provided an apparatus for supporting cooperative works via a computer network by a plurality of users, comprising: input means for entering the inputs made by each user in the cooperative works; memory means for storing inputs entered by the input means during the cooperative works, in correspondence to input target data indicating input target applications of the inputs; reproduction means for re-executing the input target applications indicated by the input target data according to the inputs stored in the memory means to reproduce results of the cooperative works resulting from the inputs; and output means for presenting the results of the cooperative works reproduced by the reproduction means to each user.

According to another aspect of the present invention there is provided a method of supporting cooperative works via a computer network by a plurality of users, comprising the steps of: storing inputs made by each user during the cooperative works, in correspondence to input target data indicating input target applications of the inputs; re-executing the input target applications indicated by the input target data according to the inputs stored at the storing step to reproduce results of the cooperative works resulting from the inputs; and presenting the results of the cooperative works reproduced at the re-executing step to each user.

Other features and advantages of the present invention will become apparent from the following description taken in conjunction with the accompanying drawings.

DETAILED DESCRIPTION OF THE PREFERRED EMBODIMENTS

Figure 1:
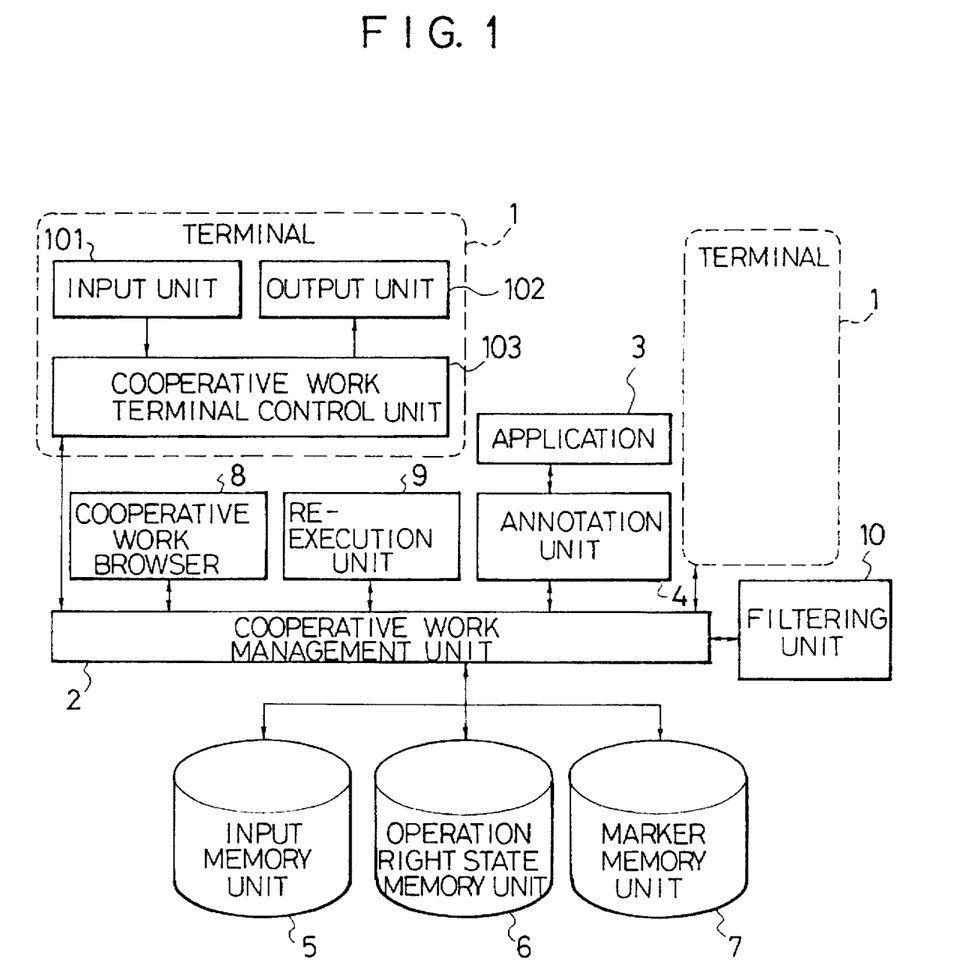
FIG. 1 is a block diagram of the first embodiment of an apparatus for supporting cooperative works according to the present invention.

Referring now to FIG. 1, the first embodiment of an apparatus for supporting cooperative works according to the present invention will be described in detail.

In this apparatus of FIG. 1, a plurality of terminals 1 (only two of which are depicted in FIG. 1) are connected with a cooperative work management unit 2 which is commonly provided with respect to all the terminals 1 for managing the entire cooperative works carried out at the terminals 1.

Each terminal 1 comprises an input unit 101, an output unit 102, and a cooperative work terminal control unit 103 connected between the cooperative work management unit 2 and the input unit 101 and output unit 102.

The cooperative work management unit 2 is also connected with applications (application programs) 3 to be utilized in the cooperative works through an annotation unit 4 for enabling each user to make annotations to be superimposed on each application 3, an input memory unit 5 for storing inputs made by the users in the cooperative works, an operation right state memory unit 6 for storing a state of an operation right to be assigned to the users, a marker memory unit 7 for storing markers used in the cooperative works, a cooperative work browser 8 for enabling each user to browse through a recorded history of the cooperative works, a re-execution unit 9 for re-executing each cooperative work according to the inputs stored in the input memory unit 5, and a filtering unit 10 for filtering out unnecessary inputs at the cooperative work management unit 2.

Figure 2:
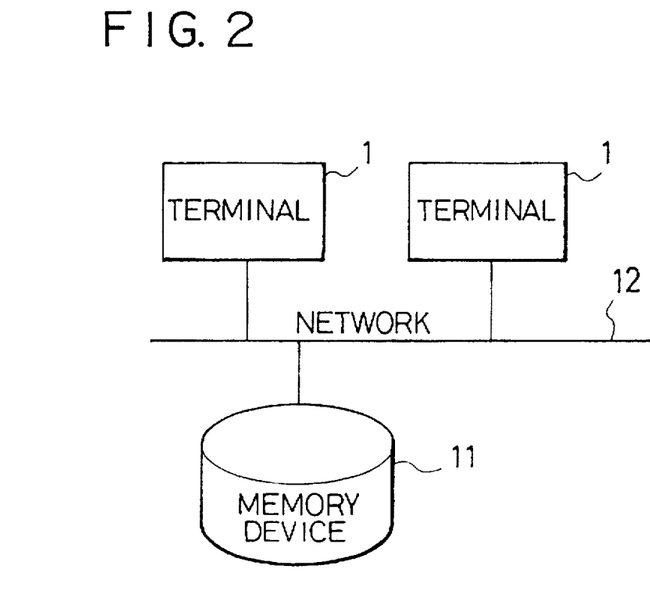
FIG. 2 is a schematic block diagram of a hardware configuration of the apparatus of FIG. 1.

In practice, this apparatus of FIG. 1 can be realized by an overall hardware configuration as shown in FIG. 2, in which a plurality of the terminals 1 (only two of which are depicted in FIG. 2) and a memory device 11 containing the input memory unit 5, the operation right state memory unit 6, and the marker memory unit 7 are mutually connected through a network 12.

In this hardware configuration of FIG. 2, the cooperative work terminal control unit 103 can be realized as a computer program executed on each terminal 1, while the cooperative work management unit 2, the applications 3, the annotation unit 4, the cooperative work browser 8, the re-execution unit 9, and the filtering unit 10 can be realized as computer programs which are executed on one of the terminals 1 or a master computer (not shown) provided on the network 12 in addition to the terminals 1.

Figure 3:
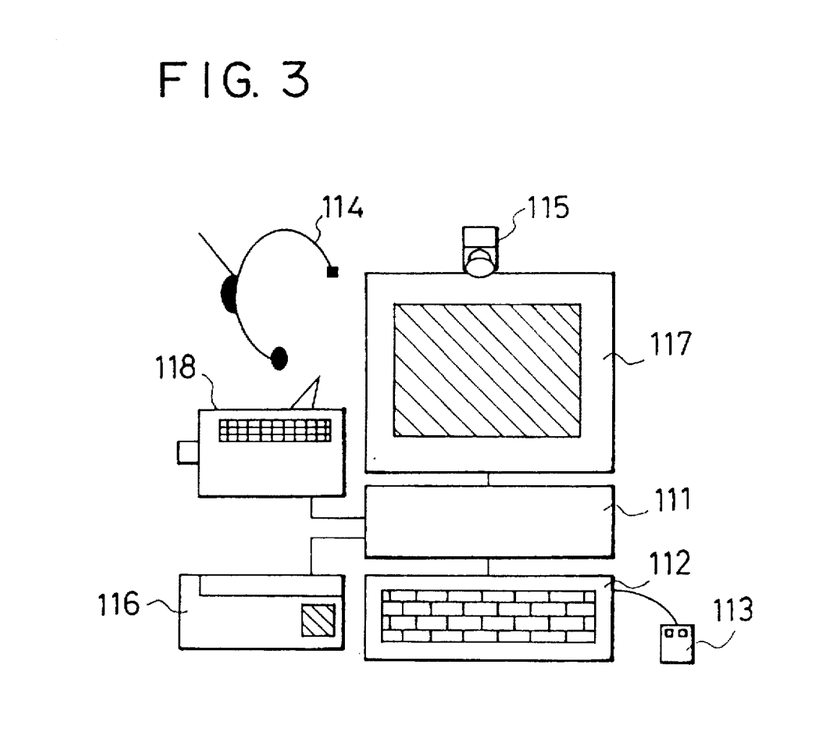
FIG. 3 is a diagram of a detailed hardware configuration of the terminal in the apparatus of FIG. 1.

Here, each terminal 1 has an exemplary hardware configuration as shown in FIG. 3, in which a terminal main body 111 is formed by a computer which is connected with a keyboard 112, a pointing device (mouse) 113, a head set 114 equipped with a microphone and a headphone, a video camera 115, and a scanner 116, which are provided as parts of the input unit 101, as well as a display 117 and a printer 118 which are provided as parts of the output unit 102. Depending on the nature of the cooperative works to be done, any unnecessary parts of the input unit 101 and the output unit 102 in this hardware configuration of FIG. 3 may be omitted from the terminal 1.

Now, this apparatus of the first embodiment operates as follows.

First, the operation to store the inputs made by the users in the cooperative works will be described.

Namely, when the input is entered by the user from the input unit 101 of the terminal 1 by initiating an input event and inputting data, the cooperative work terminal control unit 103 attaches a user ID indicating this user, an input target ID indicating one of applications 3 or the annotation unit 4 to which the input is directed, and a time stamp indicating a time at which the input is entered, the entered input.

Figure 4:
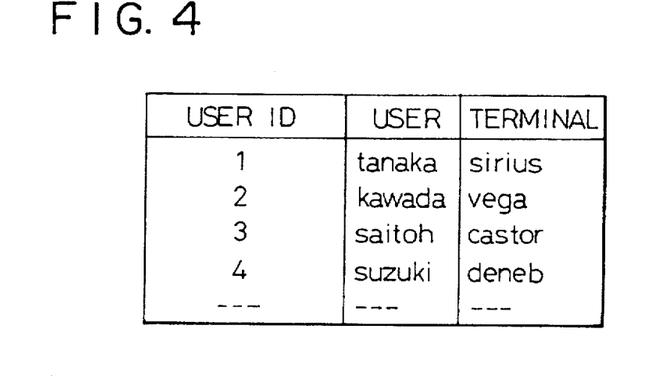
FIG. 4 is a diagrammatic illustration of a user ID table used in the apparatus of FIG. 1.
Figure 5:
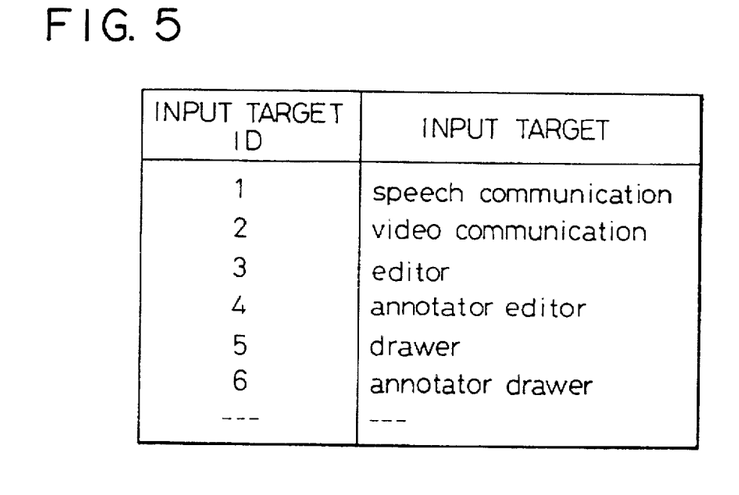
FIG. 5 is a diagrammatic illustration of an input target ID table used in the apparatus of FIG. 1.

Here, the user IDs are registered by a user ID table shown in FIG. 4 in which the correspondences between the user IDs and the users are tabulated, while the input target IDs are registered by an input target ID table shown in FIG. 5 in which the correspondences between the input target IDs and the input targets are tabulated, where the user ID table and the input target ID table are managed by the cooperative work management unit 2 and can be looked up from the cooperative work terminal control unit 103 of each terminal 1. In this case, each communication means for handling speech, video, etc., provided for the purpose of the cooperative works is also regarded as a type of the application, and will be given an input target ID indicating it when the input is directed to it.

Next, the cooperative work terminal control unit 103 checks the presence or absence of the operation right assigned to this user with respect to the input target of this input, i.e., whether this user has a right to operate on the input target of this input. Here, the assigned operation rights are registered by an operation right table shown in FIG. 6 which tabulates the users IDs defined in the user ID table of FIG. 4 for the operation right holders with respect to each input target ID defined in the input target ID table of FIG. 5. In this operation right table of FIG. 6, the user ID "0" indicates the assignment of the operation right to all the users. This operation right table is also managed by the cooperative work management unit 2 and can be looked up from the cooperative work terminal control unit 103 of each terminal 1.

In a case where the presence of the operation right is confirmed, the input is transmitted to the cooperative work management unit 2, whereas otherwise the user is notified by a notice for an absence of the operation right which is presented through the output unit 102 of each terminal 1.

Figure 7:
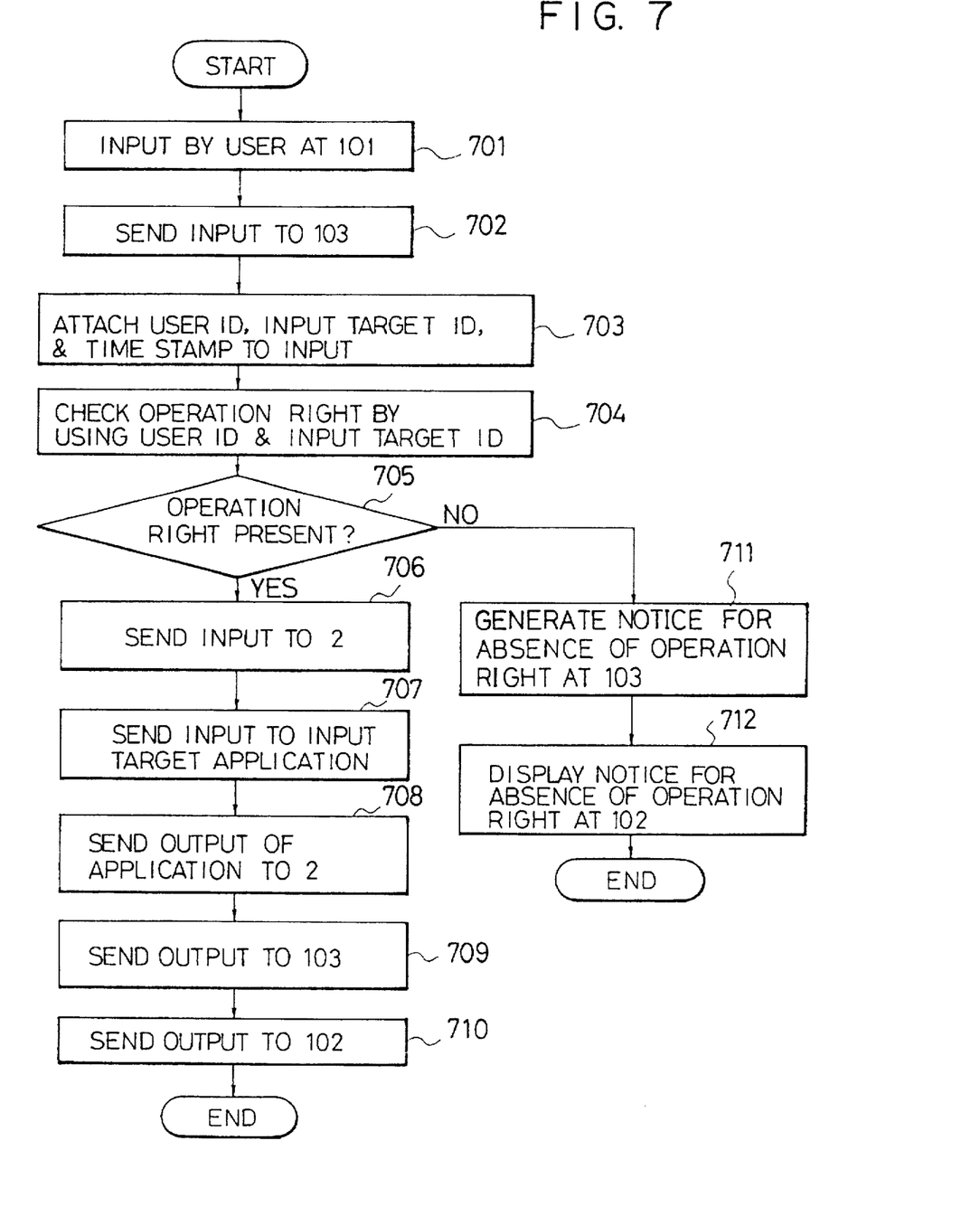
FIG. 7 is a flow chart of the operation for entering the inputs of the cooperative works in the apparatus of FIG. 1.

Thus, the operation for entering the inputs made by the users in the cooperative works is carried out according to the flow chart of FIG. 7 as follows.

First, when the input by the user is entered from the input unit 101 at the step 701, the entered input is sent to the cooperative work terminal control unit 103 at the step 702, and the user ID, the input target ID, and the time stamp are attached to this input at the step 703.

Then, the presence or absence of the operation right for this input is checked by using the attached user ID and input target ID at the step 704. In a case where the operation right for this input is present at the step 705, this input is sent to the cooperative work management unit 2 at the step 706, and then to the input target application at the step 707.

After the input target application is operated by this input, the output of the input target application is sent to the cooperative work management unit 2 at the step 708. Then, this output is sent to the cooperative work terminal control unit 103 of the original terminal 1 from which this input was entered at the step 709, and finally this output is outputted from the output unit 102 of this terminal 1 at the step 710.

On the other hand, in a case where the operation right for this input is absent at the step 705, the notice for the absence of the operation right is generated at the cooperative work terminal control unit 103 of the original terminal 1 from which this input was entered at the step 711, and finally this notice for the absence of the control right is displayed by the output unit 102 of this terminal 1 at the step 712.

Next, the user interface for controlling the cooperative works provided by the cooperative work terminal control unit 103 of each terminal 1 under the control of the cooperative work browser 8 will be described in detail.

Figure 8:
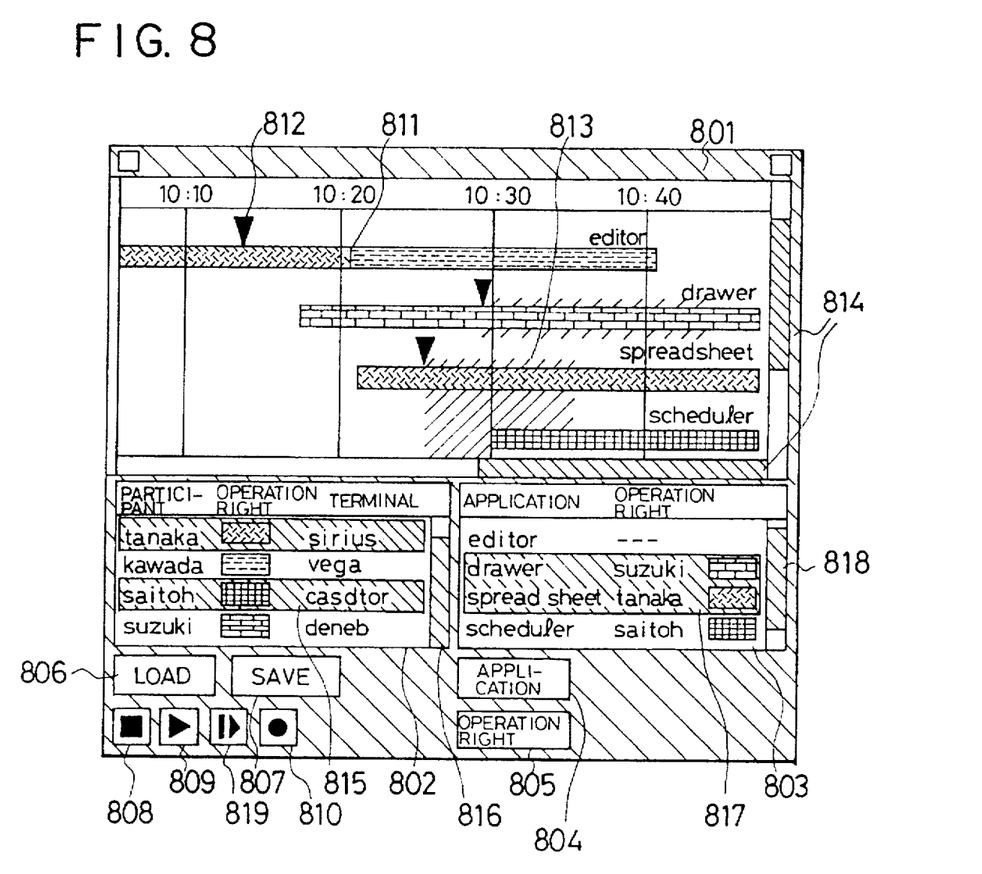
FIG. 8 is an illustration of a user interface display provided in the apparatus of FIG. 1.

Namely, in this first embodiment, the user interface comprises a graphic display on the output unit 102 in a form shown in FIG. 8, which has three window display sections including a cooperative work input browser sub-window 801, a participant list 802 for listing participants of the cooperative works, and an application list 803 for listing applications utilized in the cooperative works.

In addition, this user interface of FIG. 8 also provides various buttons to be operated by the user including, an application button 804 to be used in adding a new application, an operation right button 805 to be used in requesting the operation right, a load button 806 to be used in loading the cooperative work inputs stored in the input memory unit 5 along with the associated operation right states stored in the operation right state memory unit 6 and markers stored in the marker memory unit 7, a save button 807 to be used in saving the cooperative work inputs and the associated operation right state and markers which are temporarily stored in the cooperative work browser 8 into the input memory unit 5, the operation right state memory unit 6, and the marker memory unit 7, a reproduction button 809 to be used in re-executing the input target applications for the cooperative work inputs, a one by one reproduction button 819 to be used in re-executing the input target applications for the cooperative work inputs one input by one input, a record button 810 to be used in recording the cooperative work inputs, and a stop button 808 to be used in stopping the operations initiated by the reproduction button 809, the one by one reproduction button 819, and the record button 810.

In this user interface of FIG. 8, the cooperative work input browser displayed in the sub-window 801 graphically indicates an input sequence for each application in a form of a bar along a time axis in a horizontal direction, with indications of the operation right states expressed by different colors or hatching patterns assigned to different users. Thus, this cooperative work input browser in the sub-window 801 can graphically indicates the progresses of the cooperative works according to the inputs stored in the input memory unit 5.

For example, in a state shown in FIG. 8, a bar 811 indicates the fact that the application called "editor" had been operated under the operation right assigned to a participant named "tanaka" until about 10:21 when the operation right was switched to another participant named "kawada", and continued to be operated until about 10:41 under the operation right assigned to this participant named "kawada". This bar 811 has a marker 812 attached at about 10:13, which is linked with markers 813 attached on bars for the other applications called "drawer", "spreadsheet", and "scheduler" which indicate specified time ranges by shadings.

These markers 812 and 813 indicate the related parts of the cooperative works done by using various applications. This cooperative work input browser sub-window 801 is also equipped with a scroll bar 814 to be used in scrolling the entire sub-window display.

The participant list 802 has each entry indicating a name of each participant, a color or hatching pattern assigned to this participant, and a name given to the terminal 1 used by this participant. In a state shown in FIG. 8, the participant list 802 also has shadings 815 over the entries for the participants named "tanaka" and "saitoh", which indicate the filtering targets of the filtering unit 10. This participant list 802 is also equipped with a scroll bar 816 to be used in scrolling the entire list display.

The application list 803 has each entry indicating a name of each application, a name of a current operation right holder for this application, and a color or hatching assigned to this current operation right holder. In a state shown in FIG. 8, the entry for the application "editor" indicates that this application had already terminated, while the application list 803 also has shadings 817 over the entries for the applications "drawer" and "spreadsheet", which indicate the filtering targets of the filtering unit 10. This application list 803 is also equipped with a scroll bar 818 to be used in scrolling the entire list display.

Here, the inputs made on this user interface of FIG. 8 are also managed in the apparatus of FIG. 1 similarly to the inputs directed toward the general applications.

Now, using such a user interface, the apparatus of this first embodiment can be activated from an initial state by specifying the terminal 1 of a cooperative work participant, in response to which the user ID is assigned to this cooperative work participant by the cooperative work management unit 2 and the assigned user ID is registered into the user ID table of FIG. 4.

Then, the user interface of FIG. 8 is displayed by the output unit 102 of this terminal 1, in which the participant list 802 lists the participants according to the user ID table of FIG. 4 managed by the cooperative work management unit 2.

Next, when the record button 810 is pressed, until the stop button 808 is pressed next, the inputs of the cooperative works transmitted to the cooperative work management unit 2 are stored into a temporary memory provided in the cooperative work browser 8. At this point, when the filtering condition is specified as described in detail below, the inputs to be stored into the temporary memory of the cooperative work browser 8 are filtered by the filtering unit 10 according to the specified filtering condition.

Then, the inputs stored in the temporary memory of the cooperative work browser 8 are sequentially displayed on the cooperative work input browser sub-window 801.

Figure 9:
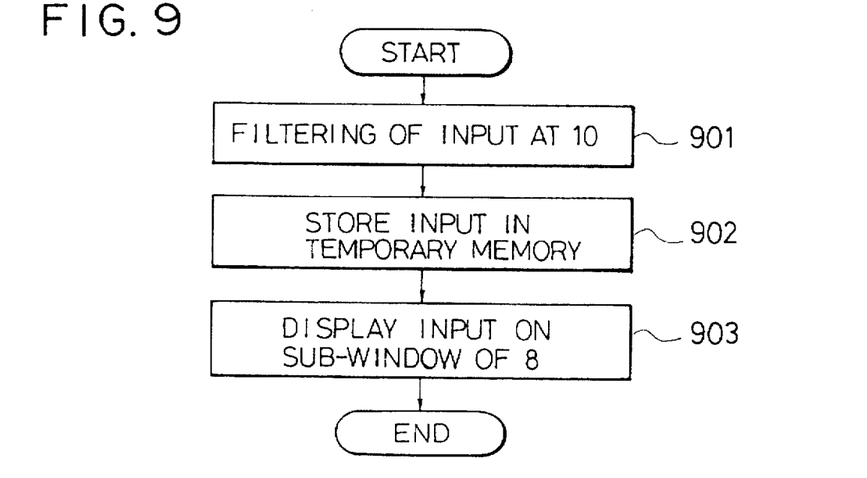
FIG. 9 is a flow chart of the operation for recording the inputs of the cooperative works in the apparatus of FIG. 1.

This operation of the recording the cooperative work inputs is thus carried out according to the flow chart of FIG. 9 as follows.

Namely, the inputs of the cooperative works are filtered by the filtering unit 10 at the step 901, and then the filtered inputs are stored into the temporary memory in the cooperative work browser 8 at the step 902. Then, the stored inputs are sequentially displayed on the cooperative work input browser sub-window 801.

Figure 10:
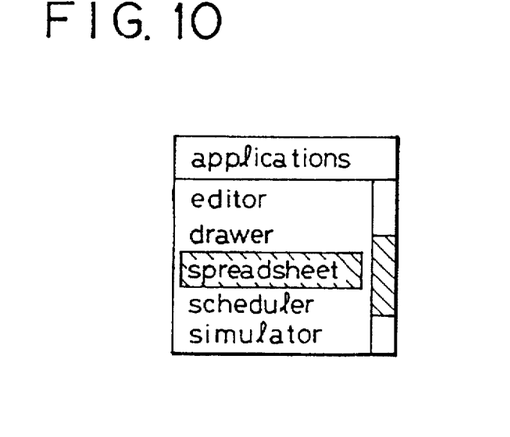
FIG. 10 is an illustration of an application menu display used in the apparatus of FIG. 1.

Next, a desired one of the applications 3 is activated. Here, when the application button 804 for adding a new application is pressed, an application menu shown in FIG. 10 listing names of all the applications that can be utilized in the cooperative works appears on the display.

Then, when the the user selects an appropriate application name from the application menu, the selected application name is transmitted to the cooperative work management unit 2. In a state shown in FIG. 10, a shading on the application "spreadsheet" indicates that this application "spreadsheet" has been selected by the user.

In response, the input target ID is assigned to this new application by the cooperative work management unit 2 and the assigned input target ID is registered into the input target ID table of FIG. 5. In a case where the new application is a window application on which the annotations can be superimposed by using the annotation unit 4, the input target ID of the annotation unit 4 is assigned to this window application such that this window application can be activated along with the annotation unit 4.

When the input target ID table of FIG. 5 is rewritten in this manner, this fact is notified to the cooperative work terminal control unit 103 of each terminal 1 and the cooperative work browser 8.

Figure 6:
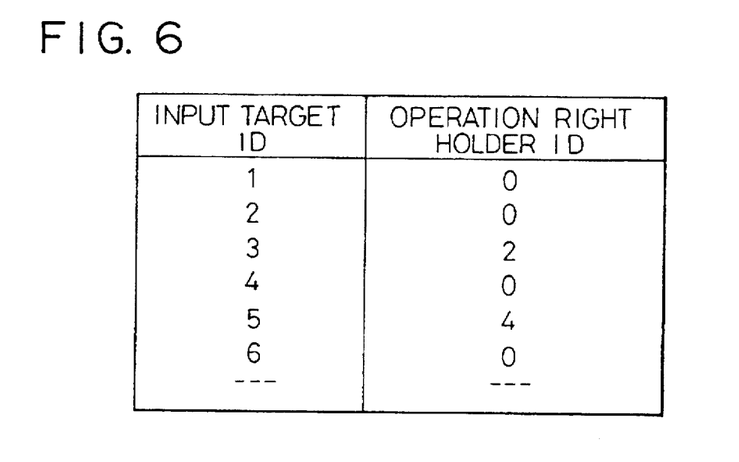
FIG. 6 is a diagrammatic illustration of an operation right table used in the apparatus of FIG. 1.

Here, the operation right for the new application is initially assigned to the user who activated this new application initially, and the assigned operation right is registered into the operation right table of FIG. 6.

When the operation right table of FIG. 6 is rewritten in this manner, this fact is notified to the cooperative work terminal control unit 103 of each terminal 1 and the cooperative work browser 8 along with a time stamp for a time of rewriting.

In response, the cooperative work browser 8 stores the rewritten operation right table along with the time stamp in the temporary memory provided therein, and rewrites the application list 803 on the user interface of FIG. 8 displayed at each terminal 1 accordingly.

Figure 11:
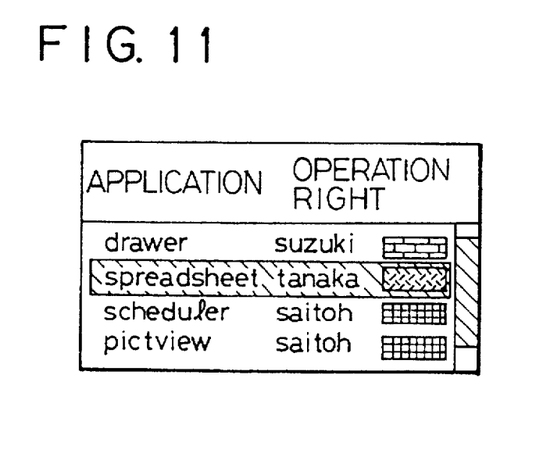
FIG. 11 is an illustration of an operation right menu display used in the apparatus of FIG. 1.

When the operation right button 805 is pressed, an operation right menu shown in FIG. 11 listing the names of the applications for which the present user has no operation right along with the name of the current operation right holders appears on the display. In a state shown in FIG. 11, a shading on the application "spreadsheet" indicates that this application "spreadsheet" has been selected by the user.

Figure 12:
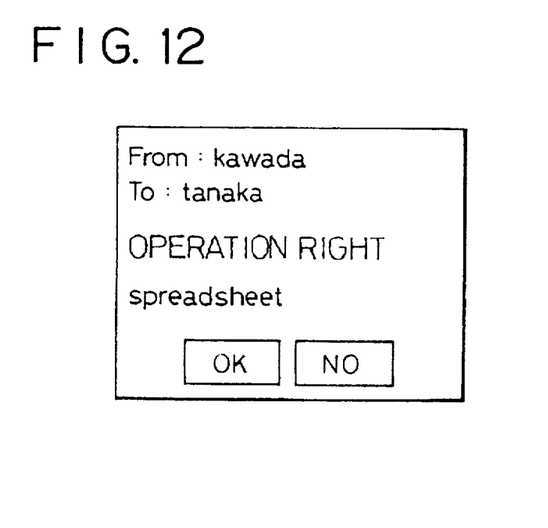
FIG. 12 is an illustration of a message window display used in the apparatus of FIG. 1.

Then, when the the user requesting the operation right selects an appropriate application name from the operation right menu, a message window shown in FIG. 12 for requesting the current operation right holder to release the operation right is outputted from the terminal 1 of the requesting user to the terminal 1 of the current operation right holder.

When an OK button provided within this message window is pressed by the current operation right holder, which is a participant named "tanaka" in a state shown in FIG. 12, the operation right for the application "spreadsheet" is switched to the requesting user, which is a participant named "kawada" in a state shown in FIG. 12. This switching of the operation right is then notified from the cooperative work terminal control unit 103 to the cooperative work management unit 2 at which the operation right table of FIG. 6 is updated accordingly.

Also, the user interface of FIG. 8 can be rewritten by the cooperative work browser 8 by transmitting an output request to the cooperative work terminal control unit 103 of each terminal 1, in response to which the cooperative work terminal control unit 103 changes the displayed user interface according to the received output request.

In this case, when the record button 810 is pressed on the user interface then, the recording of the inputs directed to this application is started, while the input sequence for the recorded inputs is indicated in the cooperative work input browser sub-window 801 on the user interface. Then, when the stop button 808 is pressed on the user interface next, the cooperative work browser 8 stops the recording of the inputs.

At this point, the filtering condition for the cooperative work inputs can be specified in the participant list 802 and the application list 803 on the user interface. The entries for the participants and the applications specified as the filtering targets are indicated by the shadings on the participant list 802 and the application list 803, such that the inputs made by the filtering target participants and the inputs directed to the filtering target applications will be filtered out by the filtering unit 10 as unnecessary at a time of storing the inputs. The filtering condition specified on the user interface is notified to the filtering unit 10 through the cooperative work management unit 2 from the cooperative work browser 8, in response to which the filtering unit 10 memorizes the specified filtering condition within itself so as to carry out the appropriate filtering of the inputs thereafter.

Also, at this point, the markers 812 and 813 for the cooperative work inputs can be attached in the cooperative work input browser sub-window 801 on the user interface by using the mouse. Here, the markers for one application can be linked with the other applications by the operation to specify the links.

Figure 13:
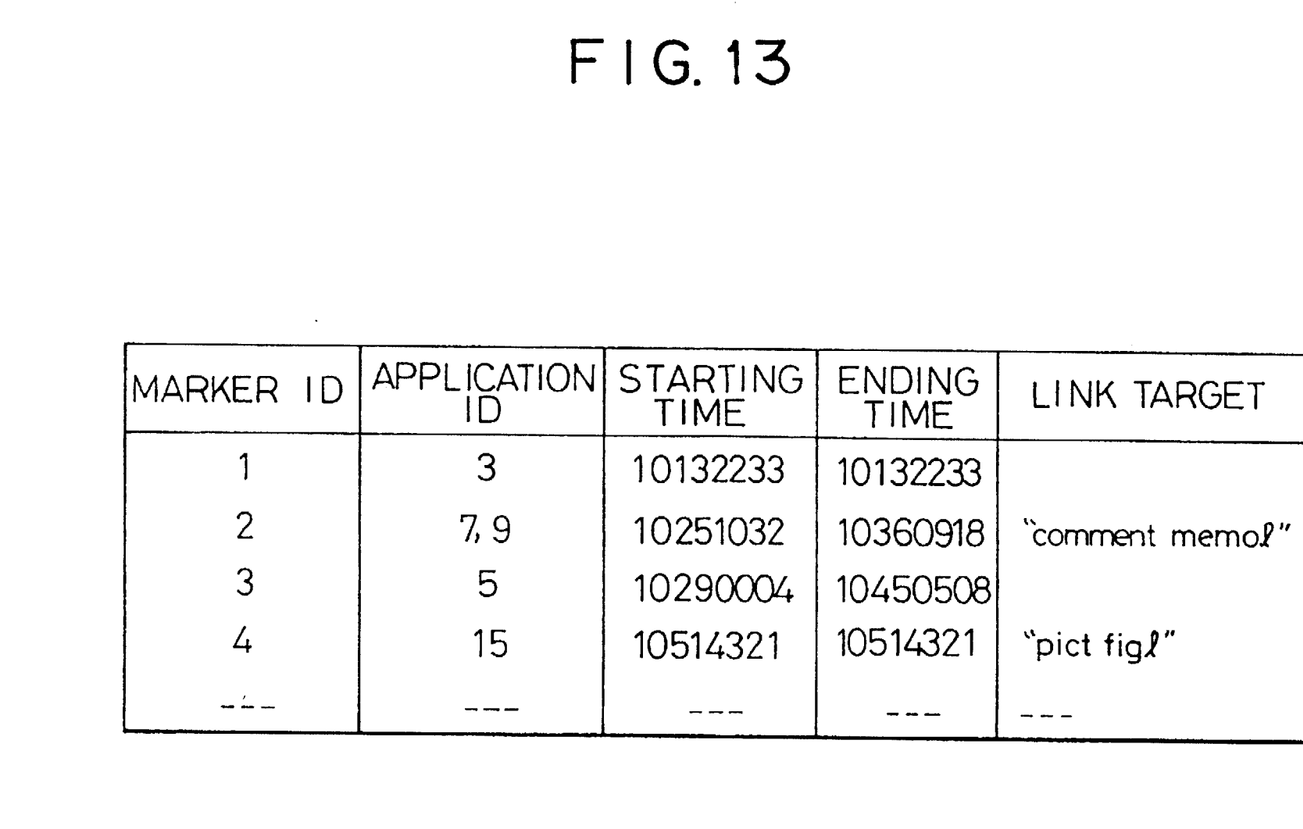
FIG. 13 is a diagrammatic illustration of a marker table used in the apparatus of FIG. 1.

The specified markers are managed by a marker table shown in FIG. 13 which is stored in the temporary memory provided in the cooperative work browser 8, in which each entry indicates a marker ID assigned to each marker, the input target ID of the application to which this marker is attached, a starting time and ending time for a time position or time range specified for this marker, and a link target application name to which this marker is linked.

Figure 14:
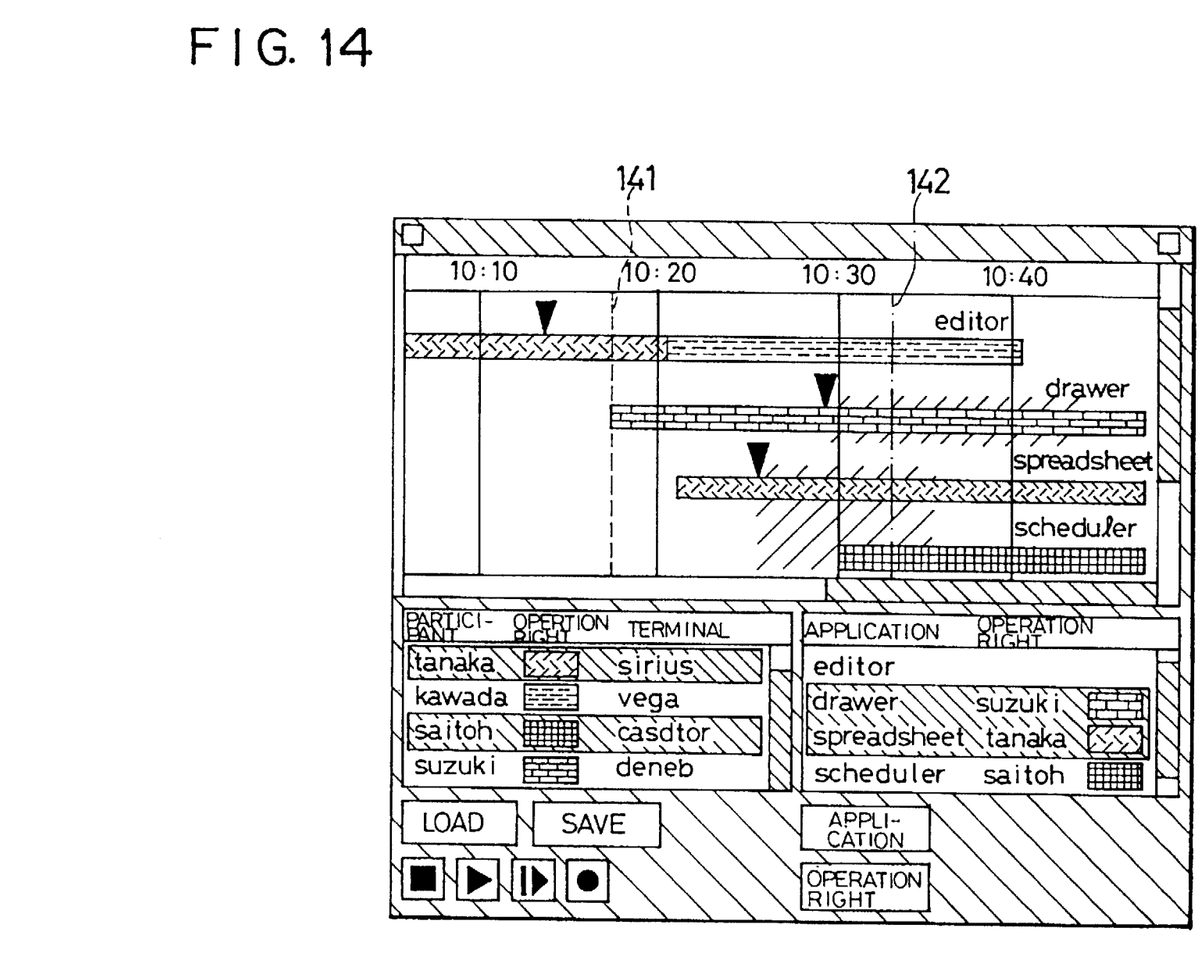
FIG. 14 is an illustration of the user interface display of FIG. 8 in specifying a time range.

Next, the operation to specify a time range for the cooperative work inputs can be carried out by operating the mouse on the cooperative work input browser sub-window 801 of the user interface. For example, as shown in FIG. 14, the starting time and the ending time of the time range to be specified can be indicated by dashed lines 141 and 142 on the cooperative work input browser sub-window 801.

Also, the operation to edit the cooperative work inputs can be carried out by operating the mouse on the cooperative work input browser sub-window 801 of the user interface. For example, the editing operations such as "cut" and "paste" can be carried out with respect to each cooperative work input for each input target.

When the save button 807 is pressed on the user interface, a pop-up menu for allowing the user to specify a name of the record to be saved appears on the display, and then after the name is specified in the pop-up menu, the cooperative work inputs temporarily stored in the cooperative work browser 8 are stored into the input memory unit 5 through the cooperative work management unit 2. Here, in a case where the filtering condition is specified, the inputs to be stored into the input memory unit 5 are filtered by the filtering unit 10 according to the specified filtering condition.

At the same time, the operation right table of FIG. 6 and the marker table of FIG. 13 which are also temporarily stored in the cooperative work browser 8 are also stored into the operation right state memory unit 6 and the marker memory unit 7, respectively, through the cooperative work management unit 2.

When the load button 806 is pressed on the user interface, a pop-up menu for allowing the user to specify the name of the desired record to be loaded appears on the display, and then after the name is specified in the pop-up menu, the appropriate ones of the cooperative work inputs, the operation right table, and the marker table are loaded from the input memory unit 5, the operation right state memory unit 6, and the marker memory unit 7, respectively, through the cooperative work management unit 2 into the temporary memory provided in the cooperative work browser 8, while the loaded data are also displayed on the user interface.

When the reproduction button 809 is pressed on the user interface, the re-execution unit 9 controls the applications 3 and/or the annotation unit 4 which are input target applications of the cooperative work inputs to be re-executed according to the cooperative work inputs and the specified filtering condition. Here, when the time range is specified as in FIG. 14, the re-execution unit 9 uses the cooperative work inputs from the specified starting time to the specified ending time, whereas otherwise the re-execution unit 9 uses a series of the input sequence from the beginning to the end.

Namely, the re-execution unit 9 controls the cooperative work browser 8 to transmit the input sequence within the specified time range sequentially to the applications 3 and/or the annotation unit 4 through the cooperative work management unit 2, at the actual time intervals between the sequentially entered cooperative work inputs according to the time stamps attached to the cooperative work inputs, such that the applications 3 and/or the annotation unit 4 can be re-executed at the actual time intervals at which they had been originally executed during the cooperative works.

On the other hand, in a case the reproduction button 809 is double clicked, the re-execution unit 9 controls the cooperative work browser 8 to transmit the input sequence within the specified time range sequentially to the applications 3 and/or the annotation unit 4 through the cooperative work management unit 2, at the prescribed constant time intervals regardless of the time stamps attached to the sequentially entered cooperative work inputs, such that the applications 3 and/or the annotation unit 4 can be re-executed at a quicker rate in a fast forward mode. The speed of the fast forward mode can be adjusted by changing the constant intervals to be prescribed.

Here, the filtering unit 10 applies the filtering according to the specified filtering condition to the cooperative work inputs transmitted from the cooperative work browser 8 at the cooperative work management unit 2, and the cooperative work management unit 2 supplies the filtered cooperative work inputs as if they are entered from one terminal 1 to the applications 3 and/or the annotation unit 4.

The input to activate one of the applications 3 is received by the cooperative work management unit 2 and then transmitted to the applications 3, and the output of the application is returned to the cooperative work management unit 2, which subsequently distributes this application output to the cooperative work terminal control unit 103 of each terminal 1 such that the application output representing the results of the cooperative works resulting from the inputs can be outputted from the output unit 102 of each terminal 1.

When the one by one reproduction button 819 is pressed on the user interface, the operation similar to that described above for a case of pressing the reproduction button 809 is carried out for just one cooperative work input per one pressing of this one by one reproduction button 819, in an order of the input sequence.

Figure 15:
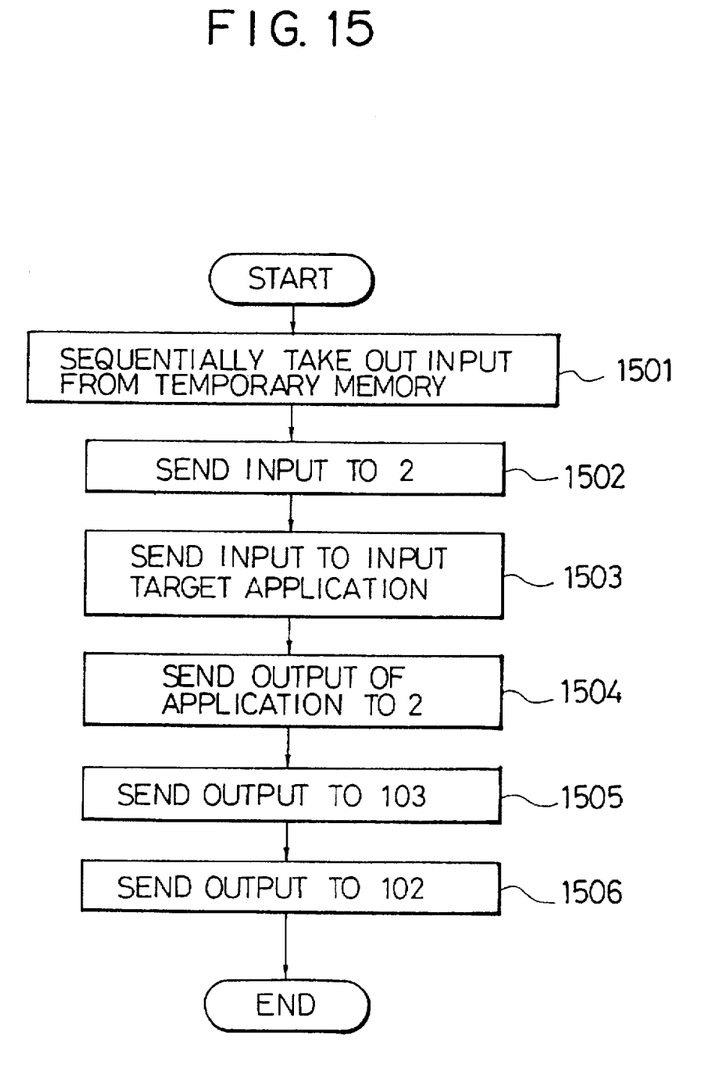
FIG. 15 is a flow chart of the operation for reproducing the cooperative works in the apparatus of FIG. 1.

Thus, the operation to reproduce the cooperative works can be carried out according to the flow chart of FIG. 15 as follows.

Namely, when the user specifies the reproduction of the cooperative works on the user interface, the cooperative work input is sequentially taken out from the temporary memory in the cooperative work browser 8 at the step 1501, and sent to the cooperative work management unit 2 at the step 1502. Then, the input is sent to its input target application at the step 1503 to obtain the output of the application. The obtained output of the application is sent to the cooperative work management unit 2 at the step 1504, and then to the cooperative work terminal control unit 103 of the terminal 1 for the user at the step 1505. Finally, the output of the application is outputted by the output unit 102 of the terminal 1 for the user at the step 1506.

In this manner, the inputs made by the participants in the cooperative works to be carried out in parallel concurrently are recorded as the record of the cooperative works, along with the associated information concerning the user who entered each input, the application to which each input is directed, and the operation right state for each application, as well as supplementary information such as markers for allowing the users to indicate cue points or key points in the cooperative works.

Then, by re-executing the applications for the recorded cooperative work inputs, a series of the results of the cooperative works resulting from the inputs can be reproduced on a computer of each user. In this reproduction, only the necessary portions in the series of the cooperative works can be reproduced selectively by using the supplementary information recorded in correspondence to the cooperative work inputs.

It is also possible to edit the stored cooperative work inputs to produce a summary in which the portions not directly relevant to the progress of the cooperative works are omitted. In this editing, the supplementary information can also be utilized as clues, in order to improve the efficiency of the subsequent cooperative works.

Figure 16:
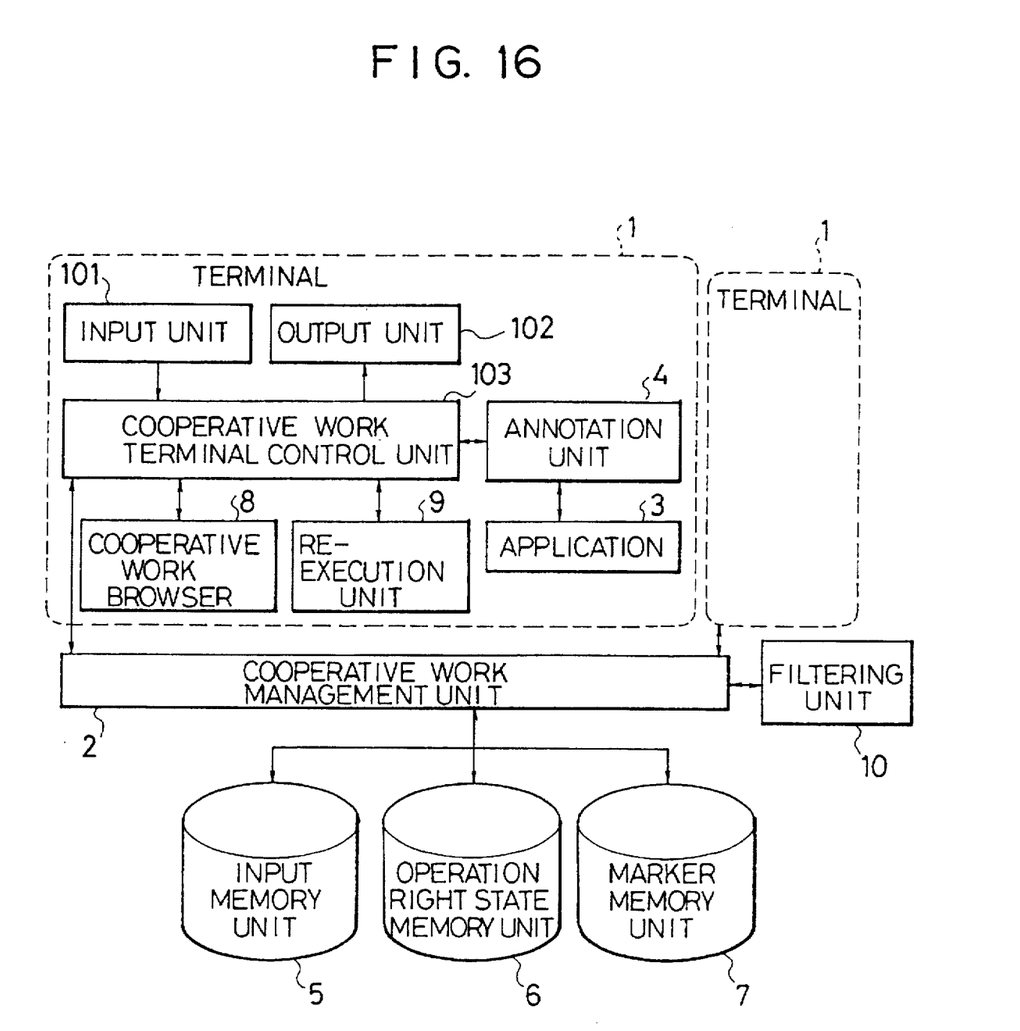
FIG. 16 is a block diagram of the second embodiment of an apparatus for supporting cooperative works according to the present invention.

Referring now to FIG. 16, the second embodiment of an apparatus for supporting cooperative works according to the present invention will be described in detail. This second embodiment of FIG. 16 is a modification of the first embodiment of FIG. 1 so that the corresponding elements are given the same reference numerals in the figure and their detailed descriptions will be omitted.

This second embodiment of FIG. 16 differs from the first embodiment of FIG. 1 in that the apparatus of the first embodiment has a concentrated type configuration in which the major operations take place on the cooperative work management unit 2 side, whereas the apparatus of this second embodiment has a distributed type configuration in which the major operations take place on the terminal 1 side.

Namely, in this configuration of FIG. 16, each terminal 1 includes the applications 3, the annotation unit 4, the cooperative work browser 8 and the re-execution unit 9, in addition to the input unit 101, the output unit 102, and the cooperative work terminal control unit 103, while the rest of the configuration of FIG. 16 is identical to that of FIG. 1.

In this case, when the input with the operation right is entered at the cooperative work terminal control unit 103 of one terminal 1, this cooperative work terminal control unit 103 transmits this input to the replica of the applications 3 and/or the annotation unit 4 which are actually executed at the terminal 1, while also transmitting this input to the cooperative work terminal control units 103 of the other terminals 1 through the cooperative work management unit 2.

The cooperative work terminal control unit 103 of the other terminal 1 which received this input from the cooperative work management unit 2 then supplies this input to the replica of the applications 3 and/or the annotation unit 4 which are actually executed at that other terminal 1, and outputs the output of the application from the output unit 102 through the cooperative work terminal control unit 103.

Figure 17:
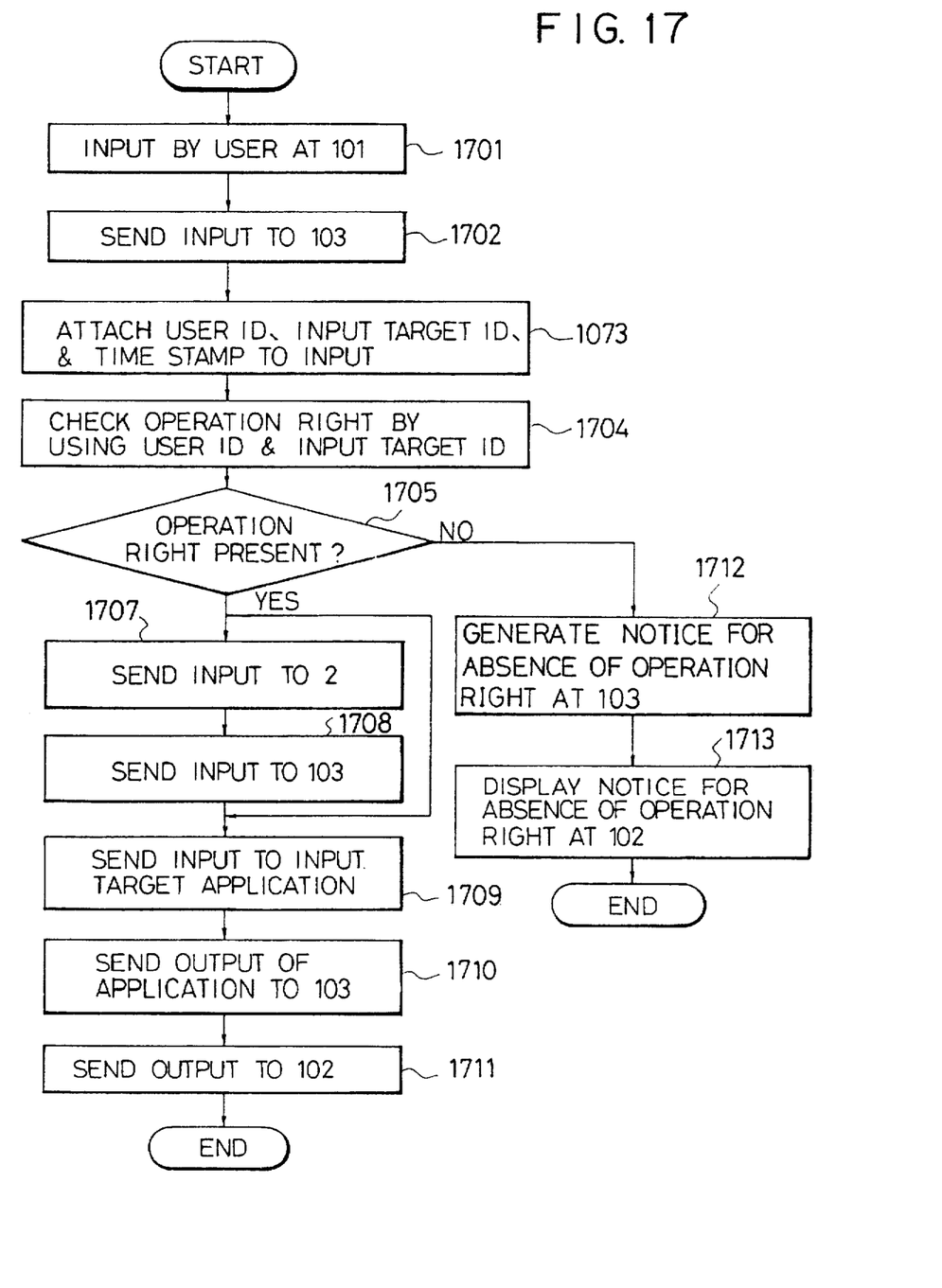
FIG. 17 is a flow chart of the operation for entering the inputs of the cooperative works in the apparatus of FIG. 16.

Thus, in this second embodiment, the operation for entering the inputs made by the users in the cooperative works is carried out according to the flow chart of FIG. 17 as follows.

First, when the input by the user is entered from the input unit 101 of one terminal 1 at the step 1701, the entered input is sent to the cooperative work terminal control unit 103 of this one terminal 1 at the step 1702, and the user ID, the input target ID, and the time stamp are attached to this input at the step 1703.

Then, the presence or absence of the operation right for this input is checked by using the attached user ID and input target ID at the step 1704. In a case the operation right for this input is present at the step 1705, this input is sent to the cooperative work management unit 2 at the step 1706, and then to the cooperative work terminal control units 103 of the other terminals 1 at the step 1707 on one hand, while these steps 1706 and 1707 are skipped for this one terminal 1 itself.

Next, at each terminal 1, this input is sent to the input target application at the step 1709, and after the input target application is executed according to this input, the output of the input target application is sent to the cooperative work management unit 2 at the step 1710. Then, this output is sent to the cooperative work terminal control unit 103 of each terminal 1, and finally this output is outputted from the output unit 102 of each terminal 1 at the step 1711.

On the other hand, in a case the operation right for this input is absent at the step 1705, the notice for the absence of the operation right is generated at the cooperative work terminal control unit 103 of this one terminal 1 from which this input was entered at the step 1712, and finally this notice for the absence of the control right is displayed by the output unit 102 of this one terminal 1 at the step 1713.

According to the present invention as described above, the following advantageous effects can be achieved.

First, the record of the cooperative works carried out by a plurality of participants via computer network can be automatically obtained by recording the inputs made at the respective computers by the participants in the cooperative works.

In this manner, it is also possible to obtain the accurate records for all the cooperative works.

Then, the cooperative works can be completely reproduced afterwards by the re-execution using the recorded inputs, without bothering anybody.

Consequently, those participants who were absent in some period of time can learn the progresses of the cooperative works made by the others during that period of time in a manner of watching the actual cooperative works.

Thus, the scheme of the present invention is suitable for the supervisor personnel to check the contents of the cooperative works done by the workers afterwards. Also, the scheme of the present invention can be utilized for the purpose of education by showing the manner of cooperative works by the skilled workers to the beginners.

It is also possible to make the selective recording and reproduction of only the necessary portions of the cooperative works, by omitting the unnecessary portions such as the trial and error process, the manual referencing, etc. which are not directly relevant to the progresses of the cooperative works.

It is also possible to improve the efficiency in the checking and reproduction of the recorded cooperative works by utilizing the markers indicating the cue points or key points of the cooperative works.

It is to be noted that, in the embodiments described above, the operation right state memory unit for storing the operation right indicating whether each user has a right to operate on the input target of the input at a time of entering the input can be replaced or used in conjunction with a memory unit for storing input user data for each input which indicate a user ID identifying a user who actually entered each input in a course of the cooperative works.

It is also to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for supporting cooperative works via a computer network by a plurality of users, comprising:

input means for entering inputs made by each user and used in executing applications during the cooperative works;

memory means for storing the inputs entered by the input means during the cooperative works together with input target data indicating input target applications associated with the stored inputs;

reproduction means for re-executing the input target applications indicated by the input target data using a recorded history of inputs stored in the memory means to reproduce results of the cooperative works once obtained in past; and output means for presenting the results of the cooperative works once obtained in past as reproduced by the reproduction means.

2. The apparatus of claim 1, further comprising user interface means for allowing each user to control operations of the memory means and the reproduction means.

3. The apparatus of claim 1, further comprising user interface means for displaying a cooperative work input browser for graphically indicating a progress of the cooperative works according to the inputs and the input target data stored in the memory means.

4. The apparatus of claim 3, wherein the memory means also stores marker data indicating markers to be displayed in the cooperative work input browser by the user interface means.

5. The apparatus of claim 1, wherein the memory means stores operation right data indicating an operation right assigned to a user for each input target application at a time of entering each input.

6. The apparatus of claim 1, wherein the memory means also stores input user data indicating a user ID which identifies a user who entered each input at the input means during the cooperative works.

7. The apparatus of claim 1, wherein the memory means also stores a time stamp for each input indicating a time of entering each input by the input means, and the reproduction means re-executes the input target applications at time intervals between sequentially entered inputs according to the time stamp of each input.

8. The apparatus of claim 1, wherein the reproduction means re-executes the input target applications at prescribed constant time intervals shorter than actual time intervals between consecutively entered inputs during the cooperative works.

9. The apparatus of claim 1, further comprising filtering means for filtering out a part of the inputs and a part of the input target applications from the inputs and the input target data to be stored in the memory means.

10. The apparatus of claim 1, further comprising filtering means for filtering out a part of the inputs and a part of the input target applications from the inputs and the input target data to be utilized by the reproduction means in reproducing the results of the cooperative works.

11. The apparatus of claim 1, further comprising management means for managing transmissions of the inputs, the input target data, the input target applications, and the results of the cooperative works among the input means, the memory means, the reproduction means, and the output means.

12. The apparatus of claim 1, wherein the input means and the output means are provided on each terminal which is used by each user and is connected with terminals of other users via the computer network.

13. A method of supporting cooperative works via a computer network by a plurality of users, comprising the steps of:

storing inputs made by each user and used in executing applications during the cooperative works together with input target data indicating input target applications associated with the stored inputs;

re-executing the input target applications indicated by the input target data using a recorded history of inputs stored at the storing step to reproduce results of the cooperative works once obtained in past; and presenting the results of the cooperative works once obtained in past as reproduced at the re-executing step.

14. The method of claim 13, further comprising the step of providing user interface means for allowing each user to control operations at the storing step and the re-executing step.

15. The method of claim 13, further comprising the step of providing user interface means for displaying a cooperative work input browser for graphically indicating a progress of the cooperative works according to the inputs and the input target data stored at the storing step.

16. The method of claim 15, wherein the storing step also stores marker data indicating markers to be displayed in the cooperative work input browser by the user interface means.

17. The method of claim 13, wherein the storing step also stores operation right data indicating an operation right assigned to a user for each input target application at a time of entering each input.

18. The method of claim 13, wherein the storing step also stores input user data indicating a user ID which identifies a user who entered each input at the input means during the cooperative works.

19. The method of claim 13, wherein the storing step also stores a time stamp for each input indicating a time of entering each input during the cooperative works, and the re-executing step re-executes the input target applications at time intervals between sequentially entered inputs according to the time stamp of each input.

20. The method of claim 13, wherein the re-executing step re-executes the input target applications at prescribed constant time intervals shorter than actual time intervals between consecutively entered inputs during the cooperative works.

21. The method of claim 13, further comprising the step of filtering out a part of the inputs and a part of the input target applications from the inputs and the input target data to be stored at the storing step.

22. The method of claim 13, further comprising the step of filtering out a part of the inputs and a part of the input target applications from the inputs and the input target data to be utilized at the re-executing step in reproducing the results of the cooperative works.

23. In a computer network, an apparatus for supporting a cooperative work created by a plurality of users, comprising:

at least one input device for entering inputs by said users which are applied to target applications in developing a cooperative work;

a memory device for storing a history of the inputs entered by the at least one input device in developing a cooperative work, the history including the inputs entered by said users and corresponding target applications to which said inputs have been applied;

a re-execution unit for re-executing the target applications using the inputs entered by said users as stored in said history, to thereby recreate the cooperative work at a particular state of development;

at least one output device for presenting a recreated cooperative work reproduced with said re-execution unit.

* * * * *